United States Patent
Lee

(10) Patent No.: US 8,527,783 B2
(45) Date of Patent: Sep. 3, 2013

(54) BASEBAND ETHERNET EXTENSION SYSTEM OVER COAXIAL CABLE

(75) Inventor: Chien-Chung Lee, Chung Ho (TW)

(73) Assignee: Cable Vision Electronics Co., Ltd., Taipei Hsien (TW)

( * ) Notice: Subject to any disclaimer, the term of this patent is extended or adjusted under 35 U.S.C. 154(b) by 483 days.

(21) Appl. No.: 12/832,080

(22) Filed: Jul. 8, 2010

(65) Prior Publication Data

US 2011/0258466 A1 Oct. 20, 2011

(30) Foreign Application Priority Data

Apr. 20, 2010 (TW) .............................. 99207143 U

(51) Int. Cl.
*G06F 1/00* (2006.01)
(52) U.S. Cl.
USPC ....................................................... 713/300
(58) Field of Classification Search
USPC ......................................... 713/300, 320, 340
See application file for complete search history.

(56) References Cited

U.S. PATENT DOCUMENTS

| 2008/0152344 A1* | 6/2008 | Deas .............................. 398/63 |
| 2009/0052144 A1* | 2/2009 | Martich ....................... 361/728 |
| 2009/0134915 A1* | 5/2009 | Hwang et al. ................ 327/100 |
| 2010/0289668 A1* | 11/2010 | Biester et al. ............. 340/854.9 |

* cited by examiner

*Primary Examiner* — Paul Yanchus, III
*Assistant Examiner* — Alyaa T Mazyad
(74) *Attorney, Agent, or Firm* — Leong C. Lei

(57) ABSTRACT

The Ethernet extension system contains at least a signal and power conversion device, a conversion device, and a coaxial cable connected in between. The signal and power conversion device receives baseband network signal and electricity in accordance with PoE, and delivers the baseband network signal and electricity to the conversion device through the coaxial cable. The conversion device then provides the baseband network signal to an ordinary Ethernet network device. Baseband network signal and electricity as such could be delivered through a coaxial cable beyond the conventional Ethernet without additional configuration of power supplies or power sources, and without repeatedly modulation and demodulation, coding and decoding, or conversion of communication protocols.

11 Claims, 5 Drawing Sheets

BASEBAND ETHERNET EXTENSION SYSTEM OVER COAXIAL CABLE

TECHNICAL FIELD OF THE INVENTION

The present invention generally relates to Ethernet connection devices, and more particular to an Ethernet extension system capable of delivering baseband network signal and electricity over a long distance.

DESCRIPTION OF THE PRIOR ART

According to the current technology, an Ethernet connection could be extended up about 100 meters. For most domestic or office environments, this distance should be adequate, but it would be too limited for outdoor applications. For example, the distance between an outdoor video surveillance device installed in a public space and a control center is very possible longer than the current upper limit of network connection. In other words, an ordinary network structure is not applicable in this case, and a more complicated and therefore costly solution has to be employed.

In addition, for outdoor devices, the availability of electricity is more difficult than that of indoor devices. Usually, electricity is obtained over a coaxial cable or from a separate power source. As can be imagined, both approaches require additional cost, complexity, and maintenance difficulty.

SUMMARY OF THE INVENTION

A major objective of the present invention is to extend network transmission to beyond of the limitation of conventional Ethernet so that both data and electricity could be carried without additional configuration of power supplies or power sources.

The above objective is achieved by an Ethernet extension system disclosed herein. The Ethernet extension system contains at least a signal and power conversion device, a conversion device, and a coaxial cable connected in between. The signal and power conversion device contains a first signal and power separation unit, an optional first signal and power integration unit, a first conversion circuit module, and a first coaxial cable interface. The conversion device, on the other hand, contains an optional second signal and power separation unit, an optional second signal and power integration unit, a second conversion circuit module, a network interface, and a second coaxial cable interface.

In one embodiment, baseband network signal and electricity are integrated and delivered to the signal and power conversion device in accordance with the PoE technology. The first signal and power separation unit separates the baseband network signal and the electricity The baseband network signal is converted to a form suitable for delivery over a coaxial cable by the first conversion circuit module. The converted baseband network signal and the electricity separated are integrated again by the first signal and power integration unit, and the integration output is delivered over the coaxial cable through the first coaxial cable interface.

The conversion device receives the integrated baseband network signal and the electricity through the coaxial cable and the second coaxial cable interface. The second signal and power separation unit separates the baseband network signal and the electricity. The baseband network signal is converted to a form suitable for delivery through the network interface by the second conversion circuit module.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
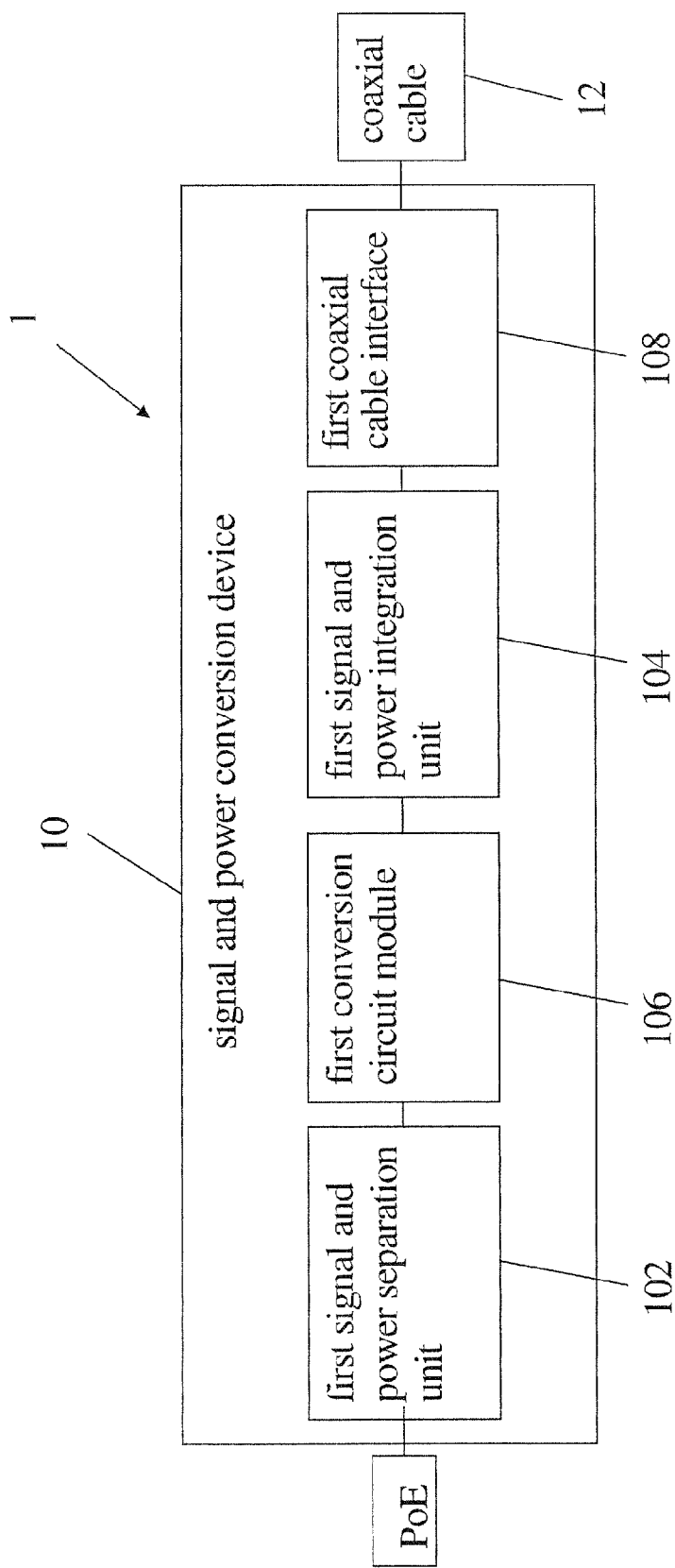
FIG. 1 is a schematic diagram showing the functional blocks of a signal and power conversion device of an Ethernet extension system according to the present invention.
Figure 2:
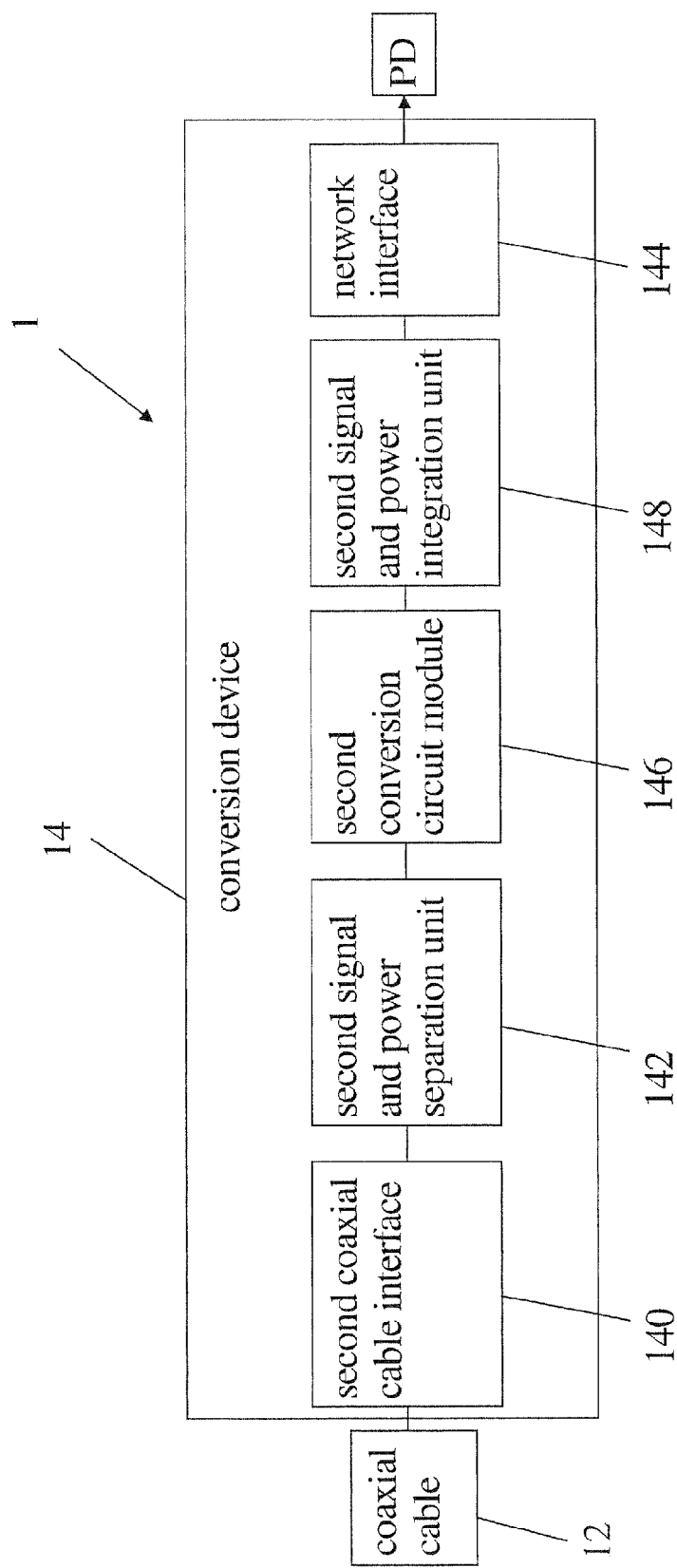
FIG. 2 is a schematic diagram showing the functional blocks of a conversion device of an Ethernet extension system according to the present invention.

As shown in FIGS. 1 and 2, an Ethernet extension system 1 according to the present invention contains at least a signal and power conversion device 10, a conversion device 14, and a coaxial cable 12 connected in between. The signal and power conversion device 10 contain a first signal and power separation unit 102, an optional first signal and power integration unit 104, a first conversion circuit module 106, and a first coaxial cable interface 108. The conversion device 14, on the other hand, contains an optional second signal and power separation unit 142, an optional second signal and power integration unit 148, a second conversion circuit module 146, a network interface 144, and a second coaxial cable interface 140. The conversion device 14 is coupled to a Powered Device (PD) via the network interface 144. The network interface 144 supports the Power over Ethernet (PoE) technology and PD is a device powered by the electricity delivered through the PoE technology.

At least one of the signal and power conversion device 10 and the conversion device 14 is capable of functioning as a Power Sourcing Equipment (PSE) or a Powered Device in accordance with the PoE specification. In addition, at least one of the first and second conversion circuit modules 106 and 146 is a passive circuit.

Figure 3:
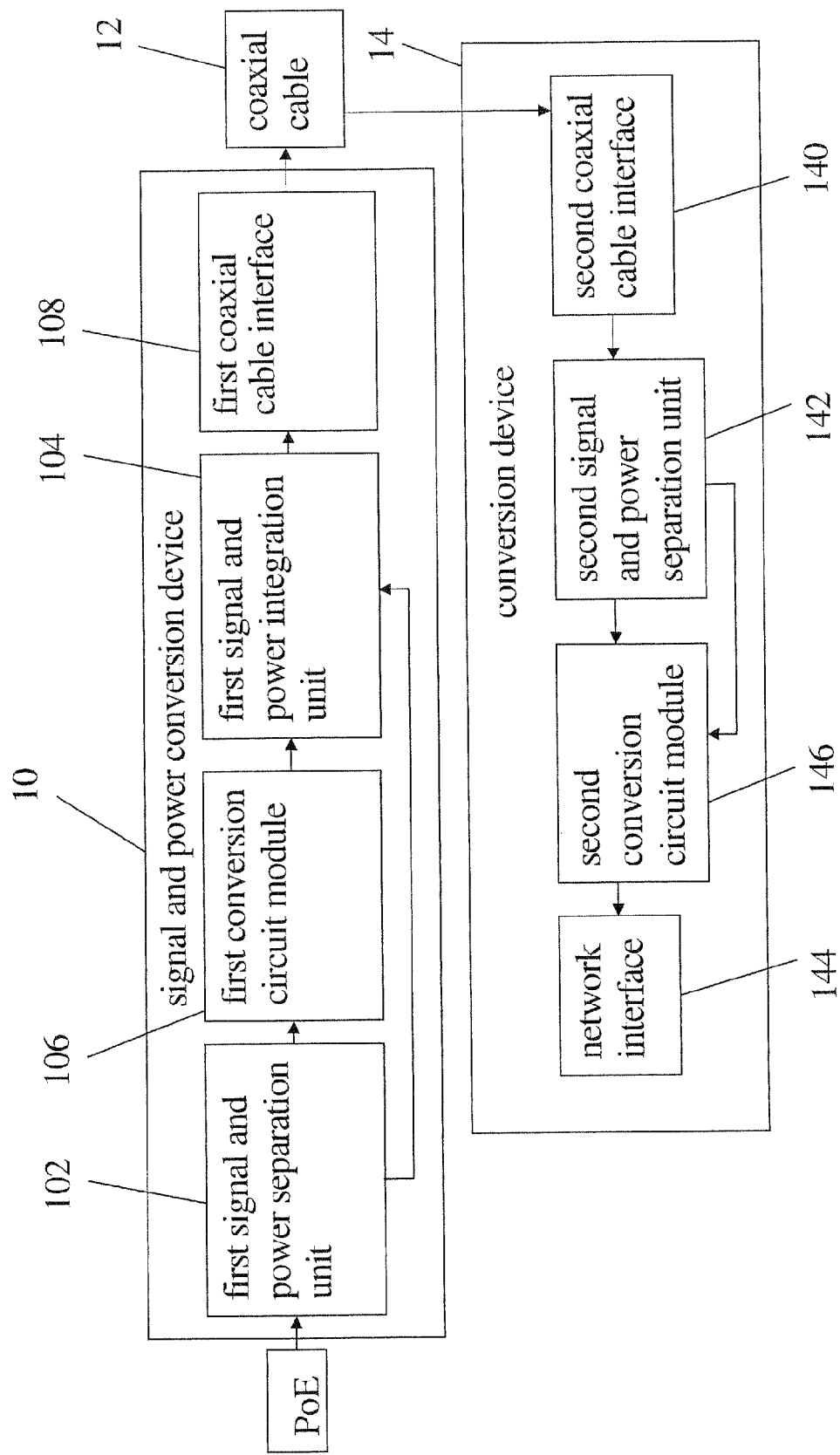
FIG. 3 is a schematic diagram showing a first embodiment of the Ethernet extension system according to the present invention.

As shown in FIG. 3 where a first embodiment of the Ethernet extension system is depicted, baseband network signal and electricity are integrated and delivered to a signal and power conversion device 10 in accordance with the PoE technology. A first signal and power separation unit 102 separates the baseband network signal and the electricity. The baseband network signal is converted to a form suitable for delivery over a coaxial cable, and delivered to a first signal and power integration unit 104 by the a first conversion circuit module 106. The electricity separated from the first signal and power separation unit 102 is also delivered to the first signal and power integration unit 104, where the converted baseband network signal and the electricity are integrated again. The integration output from the first signal and power integration unit 104 is delivered to a conversion device 14 through a first coaxial cable interface 108 and a coaxial cable 12.

The conversion device 14 receives the integrated baseband network signal and the electricity through the coaxial cable 12 and a second coaxial cable interface 140. A second signal and power separation unit 142 separates the baseband network signal and the electricity. The baseband network signal is converted to a form suitable for delivery through a network interface 144 by a second conversion circuit module 146. The converted baseband network signal is then delivered to a network device (not shown) connected to the network interface 144. The electricity separated from the second signal and power separation unit 142 is used to power the second conversion circuit module 146 and the other components.

Figure 4:
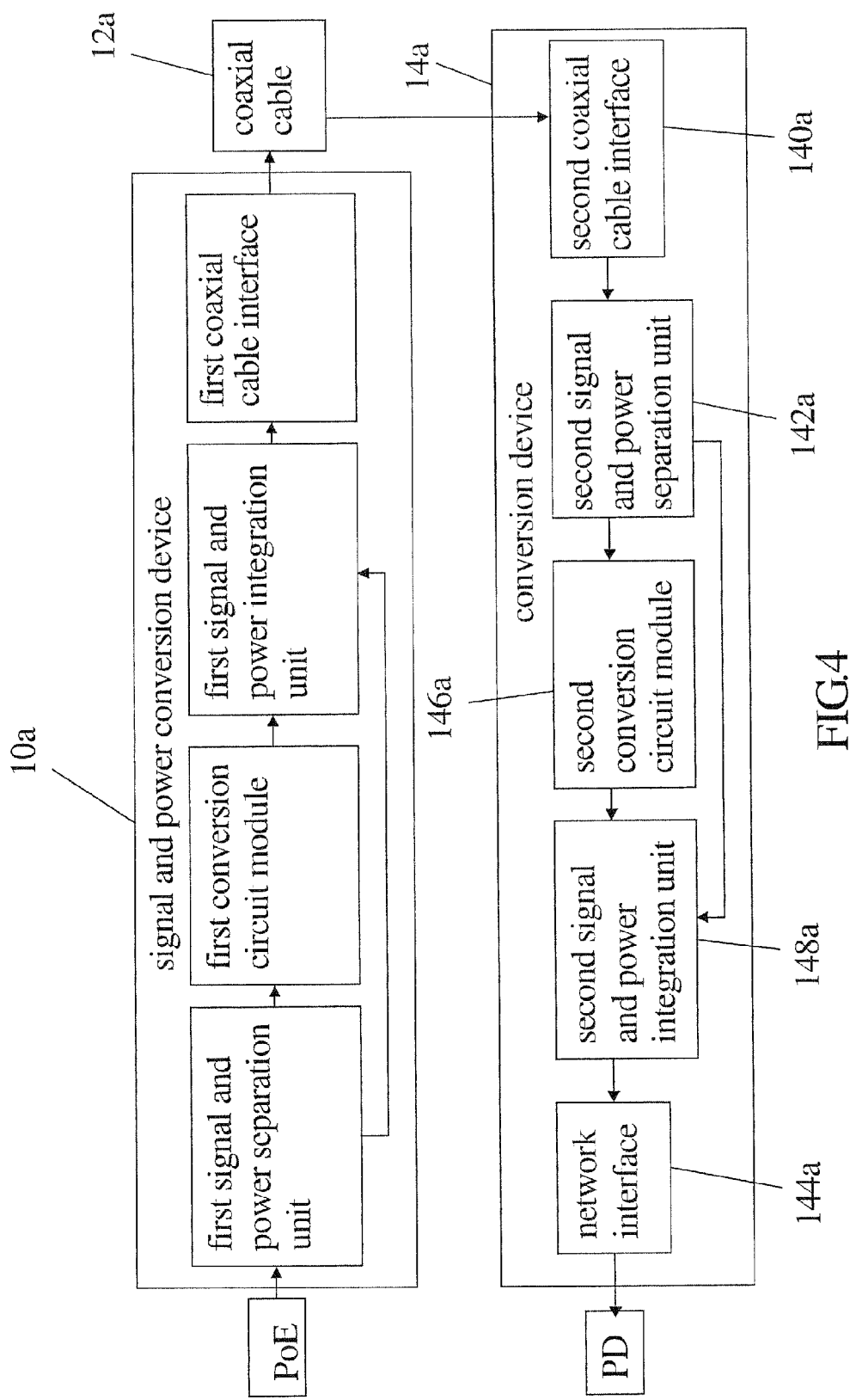
FIG. 4 is a schematic diagram showing a second embodiment of the Ethernet extension system according to the present invention.

As shown in FIG. 4 where a second embodiment of the Ethernet extension system is depicted, a signal and power conversion device 10a operates identically to the previous embodiment and its details are omitted. A conversion device 14a receives the integrated baseband network signal and the electricity through a coaxial cable 12a and a second coaxial cable interface 140a. A second signal and power separation unit 142a separates the baseband network signal and the electricity The baseband network signal is converted to a form suitable for delivery through a network interface 144a and delivered to a second signal and power integration unit 148a by a second conversion circuit module 146a. The electricity separated from the second signal and power separation unit 142a is also delivered to the second signal and power integration unit 148a, where the converted baseband network signal and the electricity are integrated again. The integration output from the second signal and power integration unit 148a is delivered to a Powered Device connected to the network interface 144a.

Figure 5:
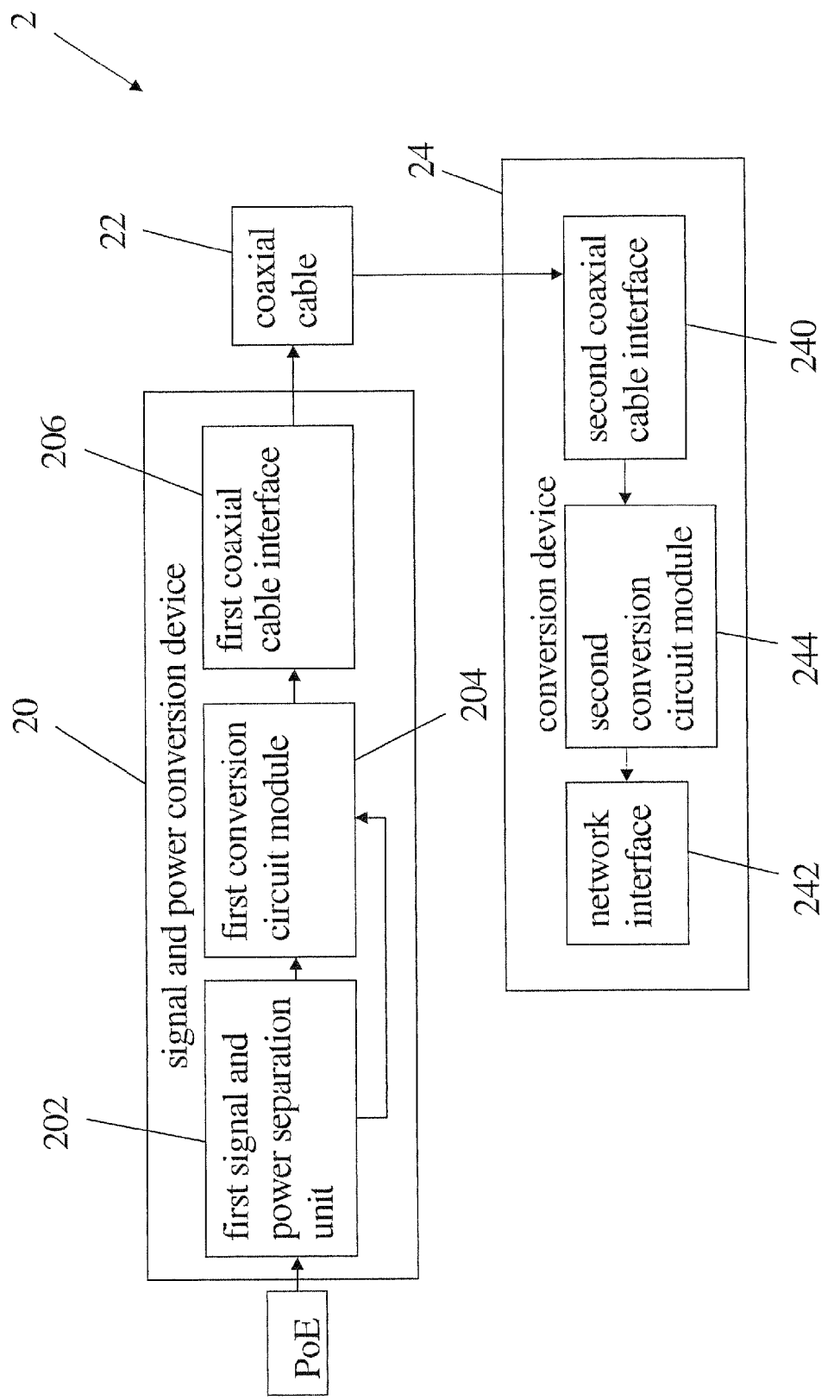
FIG. 5 is a schematic diagram showing a third embodiment of the Ethernet extension system according to the present invention.

As shown in FIG. 5 where a third embodiment of the Ethernet extension system is depicted, the Ethernet extension system 2 contains a signal and power conversion device 20, a conversion device 24, and a coaxial cable 22 connected in between. The signal and power conversion device 20 could function as a Power Sourcing Equipment or a Power Device in accordance with the PoE specification.

The signal and power conversion device 20 contains a first signal and power separation unit 202, a first conversion circuit module 204 (could be a passive circuit), and a first coaxial cable interface 206. A conversion device 24, on the other hand, contains a second conversion circuit module 244, a network interface 242, and a second coaxial cable interface 240. Baseband network signal and electricity are integrated and delivered to the signal and power conversion device 20 in accordance with the PoE technology. A first signal and power separation unit 202 separates the baseband network signal and the electricity. The baseband network signal is converted to a form suitable for delivery over a coaxial cable by a first conversion circuit module 104, and delivered to the conversion device 24 through a first coaxial cable interface 206 and the coaxial cable 22. The electricity separated from the first signal and power separation unit 202 is used to power the first conversion circuit module 204 or the other components.

The conversion device 24 receives the baseband network signal through the coaxial cable 22 and a second coaxial cable interface 240. The baseband network signal is converted to a form suitable for delivery through a network interface 242 by a second conversion circuit module 244. The converted baseband network signal is then delivered to a network device (not shown) connected to the network interface 242.

Through the above system, baseband network signal and electricity could be delivered for a distance more than 100 meters through a coaxial cable. Therefore, long-distance data and electricity delivery could be achieved without additional configuration of power supplies or power sources.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An Ethernet extension system, comprising:
a signal and power conversion device comprising a first signal and power separation unit for receiving a first integrated baseband network signal and electricity in accordance with Power over Ethernet (PoE) specification, a first signal and power integration unit, a first conversion circuit module connected to and between said first signal and power separation unit and said first signal and power integration unit, and a first coaxial cable interface connected to said first signal and power integration unit, where said first integrated baseband network signal is separated by said first signal and power separation unit; separated baseband network signal is converted by said first conversion circuit module; converted baseband network signal is integrated again with separated electricity from said first signal and power separation unit into a second integrated baseband network signal and electricity and delivered to said first coaxial cable interface;
a coaxial cable having a first end connected to said first coaxial cable interface for carrying said second integrated baseband network signal and electricity; and
a conversion device comprising a second coaxial cable interface connected to a second end of said coaxial cable, a second signal and power separation unit connected to said second coaxial cable interface, a second conversion circuit module connected to said second signal and power separation unit, and a network interface connected to said second conversion circuit module, where baseband network signal is separated by said second signal and power separation unit from said second integrated baseband network signal and electricity, converted by said second conversion circuit module, and delivered to said network interface.

2. The Ethernet extension system according to claim 1, wherein said network interface is a PoE interface.

3. The Ethernet extension system according to claim 1, wherein said conversion device further comprises a second signal and power integration unit capable of integrating baseband network signal and electricity for delivery over said network interface.

4. The Ethernet extension system according to claim 1, wherein at least one of said signal and power conversion device and said conversion device functions as a Power Sourcing Equipment (PSE) in accordance with the PoE specification.

5. The Ethernet extension system according to claim 1, wherein at least one of said signal and power conversion device and said conversion device functions as a Powered Device (PD) in accordance with the PoE specification.

6. The Ethernet extension system according to claim 1, wherein said conversion device is coupled to a PD in accordance with the PoE specification.

7. The Ethernet extension system according to claim 1, wherein at least one of said first and second conversion circuit module is a passive network.

8. An Ethernet extension system, comprising:
a signal and power conversion device comprising a first signal and power separation unit for receiving a first integrated baseband network signal and electricity in accordance with Power over Ethernet (PoE) specification, a first coaxial cable interface, and a first conversion circuit module connected to said first signal and power separation unit and said first coaxial cable interface, where said first integrated baseband network signal is separated by said first signal and power separation unit into a baseband network signal, converted by said first conversion circuit module, and delivered to said first coaxial cable interface;
a coaxial cable having a first end connected to said first coaxial cable interface for carrying said baseband network signal; and
a conversion device comprising a second coaxial cable interface connected to a second end of said coaxial cable, a network interface, and a second conversion circuit module connected to said second coaxial cable interface and said network interface, where said baseband network signal is converted by said second conversion circuit module and delivered to said network interface.

9. The Ethernet extension system according to claim 8, wherein said signal and power conversion device functions as a Power Sourcing Equipment (PSE) in accordance with the PoE specification.

10. The Ethernet extension system according to claim 8, wherein said signal and power conversion device functions as a Powered Device (PD) in accordance with the PoE specification.

11. The Ethernet extension system according to claim 8, wherein said first conversion circuit module is a passive network.

\* \* \* \* \*